United States Patent
He et al.

(10) Patent No.: US 9,534,062 B2
(45) Date of Patent: Jan. 3, 2017

(54) SYNTHESIS OF AN ACRYLATE POLYMER IN FLOW REACTOR

(71) Applicant: Corning Incorporated, Corning, NY (US)

(72) Inventors: Mingqian He, Horseheads, NY (US); Clemens Rudolf Horn, Guibeville (FR); Jieyu Hu, Littleton, CO (US); Patrick Jean, Le Chatelet en Brie (FR); Weijun Niu, Painted Post, NY (US); David Neal Schissel, Painted Post, NY (US); Michael James Winningham, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/721,298

(22) Filed: May 26, 2015

(65) Prior Publication Data

US 2016/0002367 A1    Jan. 7, 2016

Related U.S. Application Data

(60) Provisional application No. 62/020,005, filed on Jul. 2, 2014.

(51) Int. Cl.

| | |
|---|---|
| *C08F 2/01* | (2006.01) |
| *C08F 4/04* | (2006.01) |
| *B01J 19/00* | (2006.01) |
| *C08F 220/18* | (2006.01) |
| *B01F 13/00* | (2006.01) |
| *C08F 220/12* | (2006.01) |
| *B01F 13/10* | (2006.01) |

(52) U.S. Cl.
CPC .............. *C08F 2/01* (2013.01); *B01J 19/0093* (2013.01); *C08F 4/04* (2013.01); *C08F 220/18* (2013.01); *B01F 13/0059* (2013.01); *B01F 13/1016* (2013.01); *B01J 2219/0086* (2013.01); *B01J 2219/00792* (2013.01); *B01J 2219/00873* (2013.01); *B01J 2219/00889* (2013.01); *C08F 220/12* (2013.01)

(58) Field of Classification Search
CPC ..................................... C08F 2/01; C08F 4/04
See application file for complete search history.

(56) References Cited

U.S. PATENT DOCUMENTS

2003/0072690 A1* 4/2003 Royer ............... B01J 3/008 422/131
2014/0341524 A1 11/2014 Bookbinder et al.

FOREIGN PATENT DOCUMENTS

WO    2010054347 A1    5/2010

OTHER PUBLICATIONS

Wilms, et al., Microstructured Reactors for Polymer Synthesis: A Renaissance of Continuous Flow Process for Tailor-Made Macromolecules? Macromol. Chem. Phys. vol. 209, Feb. 13, 2008, pp. 343-356.
Micic, et al., Scale-up of the Reversible Addition-Fragmentation Chain Transfer (RAFT) Polymerization Using Continuous Flow Processing, Processes, vol. 2, Jan. 8, 2014, pp. 58-70.
Serra, et al., Microfluidic-Assisted Synthesis of Polymer Particles, Chem. Eng. Technol., vol. 31, No. 8, Jul. 28, 2008, pp. 1099-1115.
The International Search Report and Written Opinion, dated Oct. 9, 2015 in corresponding International Application No. PCT/US2015/038445, International Filing Date Jun. 30, 2015, pp. 1-13.
Nair, K, P et al., "Complementary Hydrogen-Bonded Thermoreversible Polymer Networks with Tunable Properties", Macromolecules, 2008, 41, 3429-3438.
Islamova, R. M. et al., "Controlling the Polymerization of Methyl Methacrylate with Ternary Initiating Systems", Russian Journal of Applied Chemistry, 2006, vol. 79 (9), 1509.
Watts, P. et al., "Recent Advances in synthetic micro reaction technology", Chem. Commun., 2007, 443-467.
Vandenbergh, J. et al., "Use of a Continuous-Flow Microreactor for Thiol-Ene Functionalization of RAFT-Derived Poly (Butyl Acrylate)", Polymer Chemistry, 2012, 3(10), 2739-2742.
Iwasaki, T.et al., "Free Radical Polymerization in Microreactors. Significant Improvement in Molecular Weight Distribution Control", J. Macromolecules, 2005, 38, 1159-1163.

* cited by examiner

Primary Examiner — Robert Harlan
(74) Attorney, Agent, or Firm — Kevin L. Bray

(57) ABSTRACT

An improved process for synthesizing acrylic polymers, which is highly controllable to achieve high molecular weight, high conversion rate, and low polydispersity involves continuously introducing initiator(s), acrylic monomer(s), and optionally other monomers capable of polymerizing with the acrylic monomer(s), into a microchannel of a microreactor having an integral micromixer and an integral heat exchanger.

17 Claims, 1 Drawing Sheet

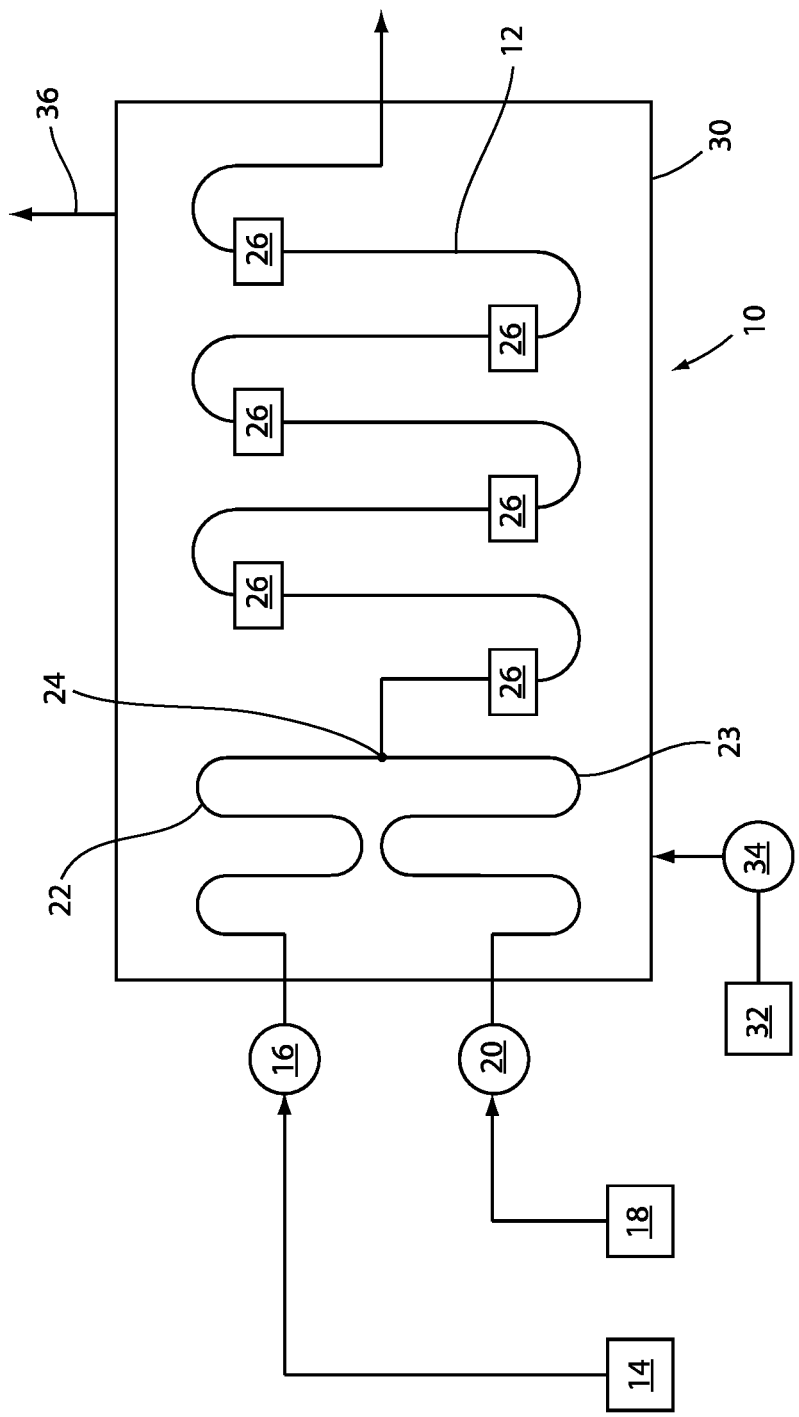

SYNTHESIS OF AN ACRYLATE POLYMER IN FLOW REACTOR

This application claims the benefit of priority under 35 U.S.C. §119 of U.S. Provisional Application Ser. No. 62/020,005 filed on Jul. 2, 2014 the content of which is relied upon and incorporated herein by reference in its entirety.

FIELD

This disclosure relates to the field of synthesis of acrylate copolymers in a continuous flow reactor.

BACKGROUND

Hydrogen-bonding group containing materials capable of associating into polymer networks have attracted significant research attention and have been proposed as candidate materials for fiber coating applications due to their good solubility, coating properties and elasticity (Nair, K, P; Victor Breedveld, V.; Weck, M. Macromolecules 2008, 41, 3429-3438). Free radical polymerization of acrylic monomers initiated by AIBN serves as an excellent method for synthesis of such materials (Islamova, R. M., et al., Polymer Science 2006, 48(3); 130; Islamova, R. M., et al. Russian Journal of Applied Chemistry 2006). Radical polymerization is a fast and exothermic reaction which can quickly release large amounts of heat. Processing at a very large scale has to be slowed down due to the limited heat removal capacity of a batch reactor. A new device featuring miniaturization of the polymerization unit and greater heat transfer efficiency with no heat accumulation during polymerization is required. The microreactor technology is considered an attractive solution because microreactor has process miniaturization and micro heat exchanger (Watts, P.; Wiles, C. Chem. Commun., 2007, 443). Recently, polymerizations using microreactor technology have been investigated (Vandenbergh, J.; Junkers, T., Polymer Chemistry 2012, 3(10), 2739). However, up to now, such polymerization processes have been performed using tubular reactors without integral mixing. In 2005, the Yoshida group reported the preparation of poly(butyl acrylate) in a microreactor system which consisted of a T-shaped micromixer and tubular flow paths with a heat-conductive reactor (Iwasaki, T.; Yoshida, J., Macromolecules 2005, 38, 1159). It was found that material with a lower polydispersity index (PDI) of molecular weight than that produced in a batch reactor could be prepared. In this device, the microtube possessed good properties for heat exchange, but didn't play a role in mixing.

Polymerization of butyl acrylate and acrylamide was used as a model reaction to study polymerization in a microreactor. Our results demonstrated that a microfluidic process strategy with simultaneous micromixing and heat transfer for the scale-up of a free radical co-polymerization process is a promising method.

SUMMARY OF THE DISCLOSURE

An improved process for synthesizing a polymer via radical chain polymerization is provided by continuously introducing at least one radical initiator and at least one monomer that is polymerizable via radical chain polymerization, into a channel of a reactor having integral mixing and integral heat exchange to effect simultaneous and continuous mixing of the monomers and reaction products, and heat transfer from the resulting copolymer product to a coolant circulating through the heat exchanger.

At least one monomer can be an acrylate, such as butyl acrylate.

At least two acrylic monomers can be used in the process, such as butyl acrylate and acrylamide.

The monomer(s), radical initiator(s), or both can be introduced to the reactor either with or without a solvent carrier.

The radical initiator can be an azo compound, such as azobisisobutyronitrile.

At least one radical initiator can be introduced into the channel by a first pump and at least one monomer can be introduced into the channel by a second pump.

BRIEF DESCRIPTION OF THE DRAWINGS

FIG. 1 is a schematic illustration of a microreactor used in the disclosed polymerization process.

DETAILED DESCRIPTION

The disclosed polymer syntheses differ from conventional free-radical initiated chain reactions by being performed in a continuous flow reactor having a reactor channel with integral heat exchange and substantially continuous mixing induced by mixers integrated into the reactor channel. This arrangement provides very uniform concentrations of reactant(s), products and initiator(s) within a differential volume of the reactor channel defined by a transverse cross-sectional area of the channel having a differential length along the flow direction of the channel. The integral heat exchange allows temperature(s) and temperature gradients within the continuous reactor to be precisely controlled.

An example of a continuous reactor having an integral heat exchanger and a permanent mixing is schematically illustrated in FIG. 1. The reactor 10 includes a channel 12 in which the chemical reactions or polymer syntheses occur. The reactant(s), products and initiator(s) continuously flow through the channel 12, such that the reactor 10 is similar to a plug flow reactor having integral heat exchange and integral mixers. However, the hydraulic diameter of the channel is typically less than 5 millimeters, more typically less than 1 millimeter, and can be less than 500 micrometers. Such reactors are typically referred to as meso-reactors (channel dimensions from about 300 µm to about 5 mm) or micro-reactors (channel dimensions from about 10 µm to about 300 µm).

An example of a suitable reactor that provides appropriate mixing and thermal control is illustrated and described in U.S. Pat. No. 7,939,033, which is incorporated in its entirety herein.

Reactants are introduced from a tank 14 via a first pump 16; an initiator is introduced from a second tank 18 via a second pump 20. A first section of reactor 10 can include channels 22 and 23 for adjusting the temperature of the reactant(s) and initiator(s) before they are combined at a mixing point 24 (e.g., a T- or Y-shaped convergence of channels 22 and 23 into channel 12).

Along the flow path of channel 12 is one or a plurality of micromixers 26. In the schematic illustration (FIG. 1), a plurality of discrete micromixers 26 are shown. However, the integral micromixer can extend continuously along the entire length of the microchannel 12. Micromixer(s) 26 can be passive or active. Examples of known passive micromixers that can be incorporated into microreactor 10 include parallel lamination and sequential lamination micromixers in which the flow stream is split into a plurality of substreams that are rejoined to form a laminate stream; and chaotic advection micromixers in which, for example, obstacles are incorporated in the microchannel to create transverse flow, or the microchannel walls are provided with a pattern of grooves to induce transverse flow. Examples of known active micromixers that can be used in the disclosed polymer synthesis apparatus include pressure field disturbance micromixers that incorporate an integrated micropump in the microreactor that alternately drives and stops or accelerates and slows flow within the microchannel; electrokinetic instability micromixers that take advantage of a fluctuating electric field to induce mixing in the microchannel; dielectrophoretic disturbance micromixers in which polarization of fluid components is induced by a non-uniform electric field causing movement of the polarized component; magneto-hydrodynamic disturbance micromixers, in which induction of Lorentz body forces in an electrolyte solution creates current flows and mixing; and ultrasound disturbance micromixers in which ultrasonic waves are introduced into the microchannel, such as by integrated piezoelectric ceramic transducers, to cause acoustic stirring of the fluid perpendicular to the main flow direction to cause mixing. Other types of micromixers can also be used. It is also possible to use a combination of micromixers.

Microreactor 10 is also provided with an integral heat exchanger 30 in which a thermal fluid (e.g., a coolant) is introduced from a tank 32 via a pump 34 into fluid passageways in intimate thermal communication with microchannel 12. In the event of a highly exothermic reaction, which is typical for radical initiated chain reaction synthesis of acrylic polymers, the heat of reaction is transferred from the fluid stream to the coolant and exits the microreactor 10 via thermal fluid outlet 36. While the illustrated reactor 10 implies a single flow chamber in microreactor 10 for the thermal fluid, multiple thermal fluid inlets and outlets can be provided.

The term "polymer" encompasses homopolymers and copolymers comprised of at least one type of monomer unit (i.e., the portion of the monomer that is incorporated into the polymer chain).

Monomers that are polymerizable via radical chain polymerization include, but are not limited to, ethylene, 1,3-dienes, styrene, halogenated alkenes, vinyl esters, acrylates, methacrylates, acrylonitrile, methacrylonitrile, arylamide, methacrylamide, N-vinylcarbazole, and N-vinyl pyrrolidone.

Acrylic monomers that are polymerizable via radical chain polymerization include, but are not limited to, acrylamides and methacrylamides such as 2-acrylamido-2-methyl-1-propanesulfonate, 3-(acrylamido)phenylborate, 3-acrylamidopropyl-trimethylamine, N-acryloylamidoethoxyethanol, alkylacrylamides, N-(3-aminopropyl) methacrylamide, N-tert-butylacrylamide, diacetone acrylamide, N,N-diethylacrylamide, N,N-diethylmethacrylamide, N,N-dimethylacrylamide, N-[3-(dimethylamino)-propyl]methacrylamide, N-ethylacrylamide, N-hydroxyethyl acrylamide, N-(hydroxymethyl) acrylamide, N-(isobutoxymethyl)-acrylamide, N-isopropylacrylamide, N-isopropylmethacrylamide, methacrylamide, N-(3-methyoxypropyl)-acrylamide, N-phenylacrylamide, N-(triphenylmethyl) methacrylamide and N-[tris(hydroxymethyl)methyl]acrylamide; acrylates, such as 4-acetoxyphenethyl acrylate, acryloyl chloride, 4-acryloylmorpholine, 2-(4-benzoyl-3-hydroxyphenoxy)ethyl acrylate, benzyl 2-propylacrylate, butyl acrylate, 2-[[(butylamino)carbonyl]oxy] ethyl acrylate, tert-butyl 2-bromoacrylate, 4-tert-butylcyclohexyl acrylate, 3-(dimethylamino)propyl acrylate, ethyl acrylate, ethyl 2-(bromomethyl)acrylate; acrylic acids, such as acrylic acid, 2-bromoacrylic acid, 2-(bromomethyl)acrylic acid, 2-ethylacrylic acid, methacrylic acid, 2-propylacrylic acid, 2-(trifluoromethyl)acrylic acid; acrylonitrile; fluorinated acrylics, such as 2,2,3,3,4,4,5,5,6,6,7,7-dodecafluoroheptyl acrylate, 2,2,3,3,4,4,4-heptafluorobutyl acrylate, 2,2,3,3,4,4,4-heptafluorobutyl methacrylate, 2,2,3,4,4,4-hexafluorobutyl acrylate, 2,2,3,4,4,4-hexafluorobutyl methacrylate, 1,1,1,3,3,3-hexafluoroisopropyl acrylate, 1,1,1,3,3,3-hexafluoroisopropyl methacrylate; and methacrylates, such as allyl methacrylate, 2-aminoethyl methacrylate, benzyl methacrylate, glycidyl methacrylate, hydroxybutyl methacrylate, 2-hydroxyethyl methacrylate, isobutyl methacrylate, methyl methacrylate, phenyl methacrylate, 3-(trimethoxysilyl)propyl methacrylate, (trimethylsilyl) methacrylate, vinyl methacrylate.

Other monomers that are polymerizable via radical chain polymerization include vinyl monomers, such as vinyl acetate, vinyl propionate, vinyl butyrates, vinyl benzoates, vinyl isopropyl acetates, vinyl halides, vinyl aromatics (e.g., styrene) allylic monomers, such as allyl acetate; and other ethylenically unsaturated monomers.

The radical initiator(s) can be thermal initiators that undergo thermal, homolytic dissociation to generate radicals. Examples of thermal initiators include peroxides such as benzoyl peroxide, dibenzoyl peroxide, succinic acid peroxide, dilauroyl peroxide, didecanoyl peroxide, dicumyl peroxide, di-t-butyl peroxide, di-t-amyl peroxide, α,α'-di(t-butyl peroxy)diisopropyl-benzene, 2,5-dimethyl-2,5-di-(t-butylperoxy) hexane, 2,5-dimethyl-2,5-di-(t-butylperoxy) hexyne-3,t-butyl cumyl peroxide, α-cumyl peroxyneodecanoate, α-cumyl peroxyneoheptanoate, t-amyl peroxyneodecanoate, t-butyl peroxyneodecanoate, di-(2-ethylhexyl) peroxy-dicarbonate, t-amyl peroxypivalate, t-butyl peroxypivalate, 2,5-dimethyl-2,5 bis(2-ethyl-hexanoylperoxy) hexane, dibenzoyl peroxide, t-amyl peroxy-2-ethylhexanoate, t-butyl peroxy-2-ethylhexanoate, 1,1-di-(t-amylperoxy)cyclohexane, 1,1-di-(t-butylperoxy) 3,3,5-trimethyl cyclohexane, 1,1-di-(t-butylperoxy)cyclohexane, OO-t-amyl-O(2-ethylhexyl)monoperoxycarbonate, OO-t-butyl O-isopropyl monoperoxycarbonate, OO-t-butyl O-(2-ethylhexyl)monoperoxycarbonate, t-amyl peroxybenzoate, t-butyl peroxyacetate, t-butyl peroxybenzoate, ethyl 3,3-di-(t-amylperoxy) butyrate, ethyl 3,3-di-(t-butylperoxy) butyrate, dicumyl peroxide; and azo compounds such as 4,4'-azobis(4-cyanovaleric acid), 1,1'-azobis(cyclohexane carbonitrile), azobisisobutyronitrile (AIBN), and 2,2'-azobis (2-methylpropionamidine)dihydrochloride, 2,2'-aziobis[2-imidazolin-2-yl)propane]dihydrochloride, 2,2'-azobis[2-(2-imidazolin-2-yl) propane disulfate dihydrate, 2,2'-azobis(2-methylpropionamidine)dihydrochloride, 2,2'-azobis[N-(2-carboxyethyl)-2-methylpropionamide]hydrate, 2,2'-azobis{2-[1-(2-hydroxyethyl)-2-imidazolin-2-yl] propane}dihydrochloride, 2,2'-azobis[2-(2-imidazolin-2-yl) propane], 2,2'-azobis(1-imino-1-pyrrolidino-2-ethylpropane)dihydrochloride, 2,2'-azobis{2-methyl-N-[1, 1-bis(hydroxymethyl)-2-hydroxyethyl]propionamide} and 2,2'-azobis[2-methyl-N-(2-hydroxyethyl) propionamide].

The radical initiator(s) can be photochemical initiators that produce radicals when irradiated, typically with ultraviolet or visible light. Examples of photochemical initiators that can be used in the process disclosed herein include benzophenone (e.g., "IRGACURE 500"), methylbenzoyl formate (e.g., "DAROCUR MBF"), 1-hydroxy-cyclohexyl-phenyl-ketone (e.g., "IRGACURE 184"), 2-hydroxy-2- methyl-1-phenyl-1-propanone (e.g., DAROCUR 1173"), 2-hydroxy-1-[4-(2-hydroxyethoxy)phenyl]-2-methyl-1-propanone (e.g., "IRGACURE 2959"), oxy-phenyl-acetic acid 2-[2 oxo-2 phenyl-acetoxy-ethoxy]-ethylester and oxy-phenyl-acetic 2-[2-hydroxy-ethoxy]-ethyl ester (e.g., "IRGACURE 754"), alpha, alpha-dimethoxy-alpha-phenylacetophenone (e.g., "IRGACURE 651"), 2-benzyl-2-(dimethylamino)-1-[4-(4-morpholinyl)phenyl]-1-butanone (e.g., "IRGACURE 369"), 2-methyl-1-[4-(methylthio)phenyl]-2-(4-morpholinyl-1-propanone (e.g., "IRGACURE 907"), diphenyl(2,4,6-trimethylbenzoyl)-phosphine oxide (e.g., "DAROCUR TPO"), phosphine oxide, phenyl bis(2,4,6-trimethyl benzoyl) (e.g., "IRGACURE 819"), bis(eta 5-2,4-cyclopentadien-1-yl)bis[2,6-difluoro-3-(1H-pyrrol-1-yl)phenyl]titanium (e.g., "IRGACURE 784"), 1-hydroxy-cyclohexyl-phenyl-ketone (e.g., ("IRGACURE 184"), 2-hydroxy-2-methyl-1-phenyl-1-propanone (e.g., "DAROCUR 1173"), 2-hydroxy-1-{4-[4-(2-hydroxy-2-methyl-propionyl)-benzyl]-phenyl}-2-methyl-propan-1-one (e.g., "IRGACURE 127"), 2-hydroxy-1-[4-(2-hydroxyethoxy)phenyl]-2-methyl-1-propanone (e.g., "IRGACURE 2959"), IRGACURE 184 (50%), benzophenone (50%) (e.g., "IRGACURE 500"), phenylglyoxylate, oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester (e.g., "IRGACURE 754"), phenyl glyoxylic acid methyl ester (e.g., "DAROCUR MBF"), 2,4,6-trimethylbenzoyl-diphenylphosphine oxide (e.g., "LUCIRIN TPO"), 2,4,6-trimethylbenzoyl-diphenyl phosphinate (e.g., "LUCIRIN TPO-L"), liquid blend of acylphosphine oxides (e.g., "IRGACURE 2100"), bis(2,4,6-trimethylbenzoyl)-phenyl-phosphineoxide (e.g., "IRGACURE 819"), IRGACURE 819 (45% active) dispersed in water (e.g., "IRGACURE 819 DW"), LUCIRIN TPO (50% by weight) DAROCUR 1173 (50% by weight) (e.g., "DAROCUR 4265"), IRGACURE 819 (20% by weight) DAROCUR 1173 (80% by weight) (e.g., IRGACURE 2022"), titanocene radical initiator titanium, bis(η5-2,4-cyclopentadien-1-yl)bis[2,6-difluoro-3-(1H-pyrrol-1-yl)phenyl]- (e.g., "IRGACURE 784"), oxime esters, oxime ester radical initiator [1-(4-phenylsulfanylbenzoyl)heptylideneamino]benzoate (e.g., "IRGACURE OXE 01"), oxime ester radical initiator [1-[9-ethyl-6-(2-methylbenzoyl)carbazol-3-yl]ethylideneamino]acetate (e.g., "IRGACURE OXE 02"), 2-methyl-1-[4-(methylthio)phenyl]-2-morpholinopropan-1-one (e.g., "IRGACURE 907"), 2-benzyl-2-dimethylamino-1-(4-morpholinophenyl)-butanone-1 (e.g., "IRGACURE 369"), 2-dimethylamino-2-(4-methyl-benzyl)-1-(4-morpholin-4-yl-phenyl)-butan-1-one (e.g., "IRGACURE 379"), modified α-aminoketone (e.g., "IRGACURE 389"), benzophenone (BP), benzophenone (e.g., "DAROCUR BP"), and benzildimethyl ketal, 2,2-dimethoxy-1,2-diphenylethan-1-one (e.g., "IRGACURE 651").

The above photoinitiators and thermal initiators are illustrative examples. These and other radical initiators may be used individually or in combination.

The monomer(s) and the radical initiator(s) can be introduced to the reactor in the form of a fluid (liquid) stream comprising a solvent into which the monomer(s) and radical initiator(s) are dissolved. Alternatively, the monomer(s) and/or the radical initiator(s) may be in the form of a fluid (liquid) and may be introduced to the reactor without a solvent. In order to facilitate high conversion of monomer(s) to polymer, while maintaining a fluid stream throughout the reactor (i.e., to prevent plugging of the reactor channel), the fluid stream typically comprises a high percentage of solvent, e.g., greater than 20% solvent, greater than 30% solvent, greater than 40% solvent, or greater than 50% solvent. However, the amount of solvent may be adjusted outside these limits depending on the characteristics of the radical polymerization system (e.g., monomer(s)), residence time, temperatures, initiators), etc.).

Conventional amounts of initiator(s) can be employed as needed to achieve a desired result (e.g., number or weight average molecular weight, molecular weight distribution or polydispersity, conversion, etc.).

Compared with a batch reactor, a flow reactor provides several significant features for acrylate copolymerization where both solvent and solvent-free polymerization processes can be done with good thermal control. The amount of polymer could be produced by changing the flow rate or residence time. Increasing flow time could lead to large-scale production. Flow rate and conversion rate can be easily controlled. Well managed heat exchange process for radical reactions is possible. Generally speaking, the polymerization process in a flow reactor is faster than that in a batch process. Polymerization was complete in shorter reaction times, as low as 7 min. A much higher average molecular weight (Mn and Mw) and far lower polydispersity index (PDI) than that produced in a batch reactor could be achieved due to better controlled reaction conditions.

Reduced operation cost is also achieved based on a reduction in equipment-size/production-capacity ratio (reaction took place in 9 modules with the size of most credit cards), labor (due to shorter reaction time and higher yield), waste production (due to high selectivity in flow reactor along with reduction of solvent used), energy consumption (lower amount of solvent requires less energy for solvent evaporation), and research cost (increasing flow time could lead to large-scale production in flow reactor; while in batch reactor, though the reaction conditions can be realized in small glass laboratory equipment with certain effort, the conditions on the pilot plant scale still need to be investigated due to safety issues).

Reduced risks associated with large scale radical polymerization are also achieved. The microreactor showed a much wider safe process window due to better heat transfer and process miniaturization (processing at a very large scale has to be slowed down to a technically controllable level.)

Reaction conditions including residence time and temperature were easily controlled. Scale up polymerization in the flow reactor can be realized by simply increasing flow time without compromising safety.

The disclosed process will be further illustrated with the following specific examples.

The disclosed processes generally achieve higher number and weight average molecular weights, e.g., greater than 50,000 and 150,000, respectively, and lower polydispersity, such as less than 5 or less than 4, as compared with batch processes. The processes also achieve relatively high conversion rates, e.g., greater than 90%, greater than 95% or greater than 99%.

EXAMPLE 1

The conversion of butyl acrylate and acrylamide to copolymer (BA-co-AA) is illustrated in this example. For comparative purposes a conventional batch reaction is performed by dissolving acrylamide (AA, 1 eq) in butyl acrylate (BA, 49 eq), to obtain solution A. Azoisobisbutyronitrile (0.21 eq) is dissolved in a solvent to obtain solution B. Solution B and solvent are added to solution A to obtain solution C, which contained 50 wt % of solvent. Solution C is purged with nitrogen for 5 min. to remove dissolved oxygen. Polymerization was performed at 65° C. by immersing the reactor in an oil bath for 18 h. Poly(butyl acrylate-co-acrylic acid) with nearly complete conversion after solvent evaporation was obtained (preliminary data indicating greater than 99% conversion).

Butyl acrylate and acrylamide were copolymerized in accordance with this disclosure in a microreactor as described in U.S. Pat. No. 7,939,033. A solution C was prepared using the same procedure as that in the batch reactor process. Solution C was introduced into an inlet of a flow reactor by pump, and continuously flowed through modules which possessed heat exchangers at an 80-100 C range for a residence time of 7 min. The exiting product was collected. Poly(butyl acrylate-co-acrylic acid) was produced at a rate of 0.5 g/min. A 94% conversion yield was obtained after solvent evaporation.

The chemical structures of the obtained polymers were characterized by 1H NMR and FT-IR as follows:

1H NMR (CD2Cl2, 300 MHz, 300 K):

δ (ppm) 4.05-4.01 (m, 2H, OCH2CH2CH2CH3); 2.28-2.26 (m, 1H, CHCO); 2.28-2.26, 1.91-1.88, 1.62-1.56 (m, 1H, CHCHCO); 1.62-1.56 (m, 2H, OCH2CH2CH2CH3); 1.41-1.34 (m, 2H, OCH2CH2CH2CH3); 0.94 (t, J=7.5 Hz, 3H, OCH2CH2CH3);

FT-IR (neat, cm-1) 1724 (C=O stretching); 1637 and 1621 (C=C stretching, disappeared); 1185

(O—C stretching)

GPC data of poly(butyl acrylate-co-acrylic acid)

The polymers were characterized by gel permeation chromatography (GPC). The samples are diluted using a tetrahydrofuran+0.05% toluene solution to a concentration of ~5000 μg/g (0.5 wt. %). The toluene is used as a flow rate marker to ensure the GPC system is consistent throughout the entire analysis. The instrument used is a Waters Alliance 2695 with Millennium software. The mobile phase is tetrahydrofuran and the column set used is a three set series of Polymer Labs columns: 2-PLgel Mixed D, 5 μm, 300×7.5 mm (polystyrene divinyl benzene copolymer) and 1-PLgel 100 Å, 5 μm, 300×7 5 mm which are optimum for the molecular weight range of interest. The columns are calibrated using polystyrene standards ranging from 160-6,980,000 using EasiCal PS-1&2 kits. The instrument parameters include using a flow rate@1.0 mL/min with a column temp@40° C. The injection volume is 100 μL using a 100 μL sample loop with a run time of 35 minutes at isocratic conditions. The detector was a Waters Alliance 2410 differential refractometer operated at 40° C. and sensitivity level 4. The samples were injected twice along with a THF+0.05% toluene blank. Reported polydispersity (PDI) is the ratio of weight average ($M_w$) to number average ($M_n$) molecular weight values. Molecular weights and polydispersities disclosed throughout this description and the appending claims are determined using this procedure.

A much higher average molecular weight (Mn and Mw) (e.g., Mw greater than 135,000; 140,000; 150,000; 160,000; or 170,000) and far lower polydispersity index (PDI) (e.g., less than 7, less than 6, less than 5, or less than 4), than that produced in a batch reactor were achieved. Reaction in the microreactor showed better selectivity than that in the batch reactor.

| Reactor | Mn | Mw | PDI |
|---|---|---|---|
| Flow reactor | 51800 | 175000 | 3.39 |
| Batch reactor | 17900 | 131000 | 7.32 |

EXAMPLE 2

In 2005, the Yoshida group reported the polymerization of butyl acrylate in a microreactor at 80 or 100° C. (Iwasaki, T.; Yoshida, J. Macromolecules 2005, 38, 1159). To further demonstrate the feasibility to carry out self-polymerization in a Corning flow reactor and compare the process of two flow reactors, butyl acrylate was subjected to radical polymerization in a Corning flow reactor.

Following the above polymerization processes for both the batch reactor and flow reactor using 50 wt % butyl acrylate solution in toluene in the presence of an effective amount of AIBN, poly(butyl acrylate) was prepared.

The results of both Corning and Yoshida groups are summarized in the Table below.

The polydispersity index (PDI) for the polymerization of butyl acrylate in the microreactor was smaller than that obtained in a batch reactor in both groups. However, polymerization in the Corning flow reactor afforded the poly(butyl acrylate) with a higher conversion yield and higher polymer molecular weight than that obtained in the microreactor from the Yoshida group.

| Entry | Reactor | Polymerization condition | Conversion yield | Mn | Mw | PDI |
|---|---|---|---|---|---|---|
| 1 | Batch reactor (Corning) | 65° C.[b]/18 h | 98% | 20100 | 128000 | 6.37 |
| 2 | Flow reactor (Corning) | 76-102° C./8 min[c] | 99% | 20900 | 97000 | 4.64 |
| 3 | Microreactor[a] (Yoshida group) | 80 or 100° C./5.0 min[d] | 89% | 19200 | 60700 | 3.16 |
| 4 | Batch reactor (Yoshida group) | 80 or 100° C./4.0 min | 88% | 9300 | 95800 | 10.3 |

[a]Stainless tube (i.d. 500 μm × 1 m, thickness of wall = 540 μm).
[b]Temperature of oil bath in which batch reactor was immersed
[c]The temperature of the top module in flow reactor is 76° C.; while the temperature of the bottom module in the flow reactor is 102° C.
[d]Stainless tube was dipped in an oil bath (80 or 100° C.).

The use of a continuous flow micro- or meso-reactor having integral mixers that provide substantially continuous mixing during the residence time in the reactor, coupled with integral heat transfer for controlling temperatures and temperature gradients in the reactor is believed to provide a combination of high conversion yield, high molecular weight and low polydispersity.

The described embodiments are preferred and/or illustrated, but are not limiting. Various modifications are considered within the purview and scope of the appended claims.

What is claimed is:

1. A process for synthesizing a polymer, comprising:
continuously introducing a fluid stream including at least one radical initiator and at least one monomer into a plug flow reactor having an integral mixer and an integral heat exchanger to effect simultaneous and substantially continuous mixing of the fluid stream, reaction of the monomers, and heat transfer from the resulting polymer product.

2. The process of claim 1, in which the fluid stream includes at least one acrylate.

3. The process of claim 1, in which the fluid stream includes at least one alkyl acrylate and a nitrogen containing monomer copolymerizable with the alkyl acrylate.

4. The process of claim 1, in which the fluid stream includes butyl acrylate and acrylamide.

5. The process of claim 1, in which at least one monomer that is introduced into the reactor is dissolved in a solvent in which the monomer is miscible.

6. The process of claim 1, in which at least one radical initiator is an azo compound.

7. The process of claim 1, in which at least one radical initiator is azobisisobutyronitrile.

8. The process of claim 1, in which at least one radical initiator that is introduced into the reactor is dispersed in a solvent in which the radical initiator is miscible.

9. The process of claim 1, in which at least one radical initiator is introduced into the reactor via a first pump and at least one acrylic monomer is introduced into the reactor via a second pump.

10. The process of claim 1, in which the copolymer product is poly (butyl acrylate-co-acrylamide).

11. The process of claim 10, in which the poly (butyl acrylate-co-acrylamide) product has a polydispersity that is less than 5.

12. The process of claim 10, in which the poly (butyl acrylate-co-acrylamide) product has a polydispersity that is less than 4.

13. The process of claim 10, in which the poly (butyl acrylate-co-acrylamide) product has a number average molecular weight greater than 50,000.

14. The process of claim 10, in which the poly (butyl acrylate-co-acrylamide) product has a weight average molecular weight greater than 150,000.

15. The process of claim 1, in which the conversion yield is greater than 90%.

16. The process of claim 10, in which the conversion yield is greater than 90%.

17. The process of claim 1, in which the reaction is exothermic and the heat exchanger is controlled such that the copolymer product leaving the reactor is at a temperature within 50° C. of the temperature at an inlet to the reactor.

* * * * *